United States Patent [19]

Valyocsik

[11] Patent Number: 4,877,593

[45] Date of Patent: Oct. 31, 1989

[54] SYNTHESIS OF CRYSTALLINE ALUMINOPHOSPHATE COMPOSITION

[75] Inventor: Ernest W. Valyocsik, Yardley, Pa.

[73] Assignee: Mobil Oil Company, New York, N.Y.

[21] Appl. No.: 166,586

[22] Filed: Mar. 10, 1988

[51] Int. Cl.$^4$ .................. C01B 25/36; B01J 27/18; C10G 0/0

[52] U.S. Cl. .................. 423/306; 502/208; 208/46

[58] Field of Search ............ 423/305, 306; 502/208; 208/46; 685/250, 252, 253, 255

[56] References Cited

U.S. PATENT DOCUMENTS

| | | | |
|---|---|---|---|
| 3,355,246 | 11/1967 | Kuehl | 23/113 |
| 3,791,964 | 2/1974 | Kuehl | 208/120 |
| 4,139,600 | 2/1979 | Rollman | 423/329 |
| 4,296,083 | 10/1981 | Rollman | 423/329 |
| 4,310,440 | 1/1982 | Wilson et al. | 252/435 |
| 4,385,994 | 5/1983 | Wilson et al. | 210/689 |
| 4,440,871 | 4/1984 | Lok et al. | 502/214 |

OTHER PUBLICATIONS

F. D'Yvoire, Memoir Presented to the Chemical Society, No. 392, "Study of Aluminum Phosphate and Trivalent Iron", Jul. 6, 1961 (rec'd), pp. 1762–1776.

Lok, B. M. et al., "The Role of Organic Molecules in Molecular Sieve Synthesis", Zeolites, 1983, vol. 3, Oct., pp. 282–291.

*Primary Examiner*—John Doll
*Assistant Examiner*—R. Bruce Breneman
*Attorney, Agent, or Firm*—Alexander J. McKillop; Charles J. Speciale; Dennis P. Santini

[57] ABSTRACT

This invention relates to a new form of crystalline aluminophosphate, to a new and useful improvement in synthesizing said crystalline material and to use of said crystalline material prepared in accordance herewith as a catalyst for organic compound, e.g. hydrocarbon compound, conversion.

18 Claims, No Drawings

SYNTHESIS OF CRYSTALLINE ALUMINOPHOSPHATE COMPOSITION

CROSS-REFERENCE TO RELATED APPLICATIONS

This is related by subject matter to applications Ser. No. 166,571 and 166,585, filed on even date herewith.

BACKGROUND OF THE INVENTION

1. Field of the Invention

This invention relates to a new and useful improvement in synthesizing a crystalline aluminophosphate from a reaction mixture containing a $C_5$–$C_7$ diamine directing agent, the new crystalline material synthesized, and to use of the crystalline matrial synthesized in accordance herewith as a catalyst component for ogranic compound, e.g. hydrocarbon compound, conversion.

More particularly, this invention relates to an improved method of preparing a crystalline aluminophosphate composition whereby synthesis is facilitated and reproducible and the product comprises crystals having large pore windows such as, for example, measuring greater than about 10 Angstroms in diameter.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous, is the "$H_1$ phase or hydrate of aluminum phosphate of F. d'Yvoire, *Memoir Presented to the Chemical Society*, No. 192, "Study of Aluminum Phosphate and Trivalent Iron" July 6, 1961 (received), pp. 1762–1776. This material, when crystalline, is identified by the Joint Commision for Powder Diffraction Standards (JCPDS), card number 15–274.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,335,246 (i.e. ZK-21) and 3,791,964 (i.e. ZK-22).

The phosphorus-substituted zeolites of Canadian Pat. Nos. 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Pat. No. 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by pre-molded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

Lok et al (Zeolites, 1983, Vol. 3, October, 282–291) teach numerous organic compounds which act as directing agents for synthesis of various crystalline materials, such as, for example, ZSM-5, ZSM-11, ZSM-12, ZSM-20, ZSM-35, ZSM-48, $AlPO_4$-5, $AlPO_4$-8, $AsPO_4$-20 and others. The article does not show use of a $C_5$–$C_7$ diamine for synthesis of the aluminophosphate of this invention.

Other publications teaching various organic directing agents for synthesis of various crystalline materials include, for example, U.S. Pat. No. 4,592,902, teaching use of an alkyltropinium directing agent, alkyl of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of a novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C4-10-diquat directing agent for synthesis of ZSM-12; U.S. Pat. No. 4,482,531, teaching synthesis of ZSM-12 with a DABCO-$C_n$-diquat, n being 4, 5, 6 or 10, directing agent; and U.S. Pat. No. 4,539,193, teaching use of bis (dimethylpiperidinium) trimethhlene directing agent for synthesis of ZSM-12.

U.S. Pat. No. 4,139,600 teaches a method for synthesis of zeolite ZSM-5, having a structure different from the presently synthesized crystal, from a reaction mixture comprising, as a directing agent, an alkyldiamine. U.S. Pat. No. 4,296,083 calims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a various assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4 or 6}N^+(CH_3)_2(C_2H_5)$ as directing agent for synthesis of ZSM-12. Synthesis of ZSM-5 is directed by the diquaternay (alkyl)$_3N^+(CH_2)_6N^+$(alkyl)$_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 have the same structure.

Applicant knows of no prior art for preparing the crystalline aluminophosphate composition of this invention utilizing as a directing agent a $C_5$–$C_7$ diamine.

SUMMARY OF THE INVENTION

An improved, economical and reproducible method for preparing crystlline aluminophosphate exhibiting valuable properties is provided. The method comprises forming a reaction mixture hydrogel containing sources of aluminum oxide, phosphorus oxide, directing agent, and water and having a composition, in terms of mole ratos, within the following ranges:

|  | Broad | Preferred | Most Preferred |
| --- | --- | --- | --- |
| $P_2O_5/Al_2O_3$ | 0.01 to 20 | 0.2 to 5 | 0.5 to 2 |
| $H_2O/Al_2O_3$ | 2 to 400 | 5 to 200 | 10 to 100 |
| $H^+/Al_2O_3$ | 0.01 to 30 | 0.5 to 20 | 1 to 10 |
| $R/Al_2O_3$ | 0.02 to 20 | 0.01 to 10 | 0.5 to 5 | where R is the directing agent, hereafter more particularly described, and maintaining the mixture until crystals of the desired crystalline material are formed.

Reaction conditions required consist of heating the foregoing reaction mixture to a temperature of from about 80° C. to about 300° C. for a period of time of from about 5 hours to about 20 days. A more preferred temperature range is from about 100° C. to about 200° C. with the amount of time at a temperature in such range being from about 24 hours to about 10 days.

The reaction of the gel particles is carried out until crystals form. The solid product comprising the desired aluminophosphate is recovered from the reaction medium, as by cooling the whole to room temperature, filtering and water washing.

EMBODIMENTS

The crystalline aluminophosphate synthesized in accordance with the present method exhibits utility as a catalyst component for certain chemical reactions of interest, including cracking, hydrocracking, disproportionation, alkylation, isomerization and oxidation.

The particular effectiveness of the presently required directing agent, when compared with other directing agents, such as those identified above, is believed due to its ability to function as a template in the nucleation and growth of the desired aluminophosphate crystals. This directing agent functions in this fashion in a reaction mixture having the above described composition. The directing agent required of the present method is a $C_5$–$C_7$ alkyldiamine, such as, for example, pentanediamine, e.g. 1,5-pentanediamine and heptanediamine, e.g. 1,7-heptanediamine.

The synthesis of the present invention may be facilitated when the reaction mixture comprises deed crystals, such as those having the structure of the product crystals. The use of at least 0.01%, preferably about 0.10%, and even more preferably about 1% seed crystals (based on total weight) of crystalline material in the reaction mixture will facilitate crystallization in the present method.

The reaction mixture composition for the synthesis of synthetic crystalline aluminophosphate hereby can be prepared utilizing materials which can supply the appropriate oxide. The useful sources of aluminum oxide include, as non-limiting examples, any known form of aluminum oxide or hydroxide, organic or inorganic salt or compound, e.g. alumina and aluminates. The useful sources of phosphorus oxide include, as non-limiting examples, any known form of phosphorus acids or phosphorus oxides, phosphates and phosphites, and organic derivatives of phosphorus.

It will be understood that each oxide component utilized in the reaction mixture for preparing the present crystalline composition can be supplied by one or more essential reactants and they can be mixed together in any order. For example, any oxide can be supplied by an aqueous solution. The reaction mixture can be prepared either batchwise or continuously. Crystal size and crystallization time for the product composition comprising the desired aluminophosphate will vary with the exact nature of the reaction mixture employed.

The crystalline composition as prepared hereby has a characteristic X-ray diffraction pattern in the as-synthesized form, the values of which are set forth in Table 1, hereinafter. The present composition as synthesized hereby can also be identified, in terms of mole ratios of oxides as follows:

$$vA:M_{x/m}{}^{m+}:AlO_2)_{1-y}{}^-:PO_2)_1$$
$$x^+:N_{y/n}{}^{n-}:w(H_2O)$$

wherein v is the number of moles of A, occluded organic material resulting from organic directing agent used in synthesis of and filling microporous voids of the product crystals, which material may be removed upon calcination, w is moles of $H_2O$, e.g. from 0 to about 5, M represents cations of valence m, N represents anions of valence n, and x and y are numbers which satisfy the following:

$$0.01 < x < 1$$

$$0.01 < y < 1$$

$$x + y < 1$$

With the organic material and water removed from the presently synthesized composition, it will have the formula:

$$M_{x/m}{}^{m+}:(AlO_2)_{1-y}{}^-:(PO_2)_{1-x}{}^+:N_{y/n}{}^{n-}$$

The X-ray diffraction pattern of the as-synthesized crystalline composition of this invention has characteristic lines shown in Table 1.

TABLE 1

| Interplanar d-Spacing (A) | Relative Intensity (I/I$_o$) |
|---|---|
| 13.721 ± 0.1 | w-m |
| 9.449 ± 0.1 | vs |
| 7.525 ± 0.1 | w |
| 6.688 ± 0.05 | w |
| 5.927 ± 0.05 | w |
| 5.204 ± 0.05 | w |

These X-ray diffraction data were collected with a Scintag diffraction system, equipped with a graphite diffracted bweam monochromator and scintillation counter, using copper K-alpha radiation. The K-alpha 2 component of the K-alpha 1-K-alpha 2 doublet was removed with a computer stripping program. The effective X-ray wavelength for the tabulated data is therefore the K-alpha 1 value of 1.5405 Angstroms. The diffraction data were recorded by step-scanning at 0.02 degrees of two-theta, where theta is the Bragg angle, and a counting time of 1 asecond for each step. The interplanar spacings, d's, were calculated in Angstrom units (A), and the relative intensities of the lines, I/I$_o$, where I$_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

While the improved crystalline composition of the present invention may be used as a catalyst component in a wide variety of organic compound, e.g. hydrocarbon compound, conversion reactions, it is notably useful in the processes of cracking, hydrocracking, isomerization and reforming. Other conversion processes for which the present composition may be utilized as a catalyst component include, for example, dewaxing.

The crystalline aluminophosphate composition prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the crystalline composition such as, for example, by, in the case of platinum, treating the material with a platnium metal-containing ion. Suitable platinum compounds for this purpose include chloroplatinic acid, platinous chloride and various compounds containing the platinum amine complex. Combinations of metals and methods for their introduction can also be used.

The present composition, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized composition can be prepared by heating same at a temperature of from about 200° C. to about 550° C. for from 1 hour to about 48 hours.

As above mentioned, synthetic aluminophosphate prepared in accordance herewith can have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths and metals from Groups IIA, IIIA, IVA, IB, IIB, IIIB, IVB, VIB and VIII of the Periodic Table of Elements, especially Mn, Ca, Mg, Zn, Cd, Pd, Ni, Cu, Ti, Al, Sn, Fe and Co.

Typical ion exchange technique would be to contact the synthetic material with a salt of the desired replacing cation or cations. Although a wide variety of salts can be employed, particular preference is given to chlorides, nitrates and sulfates.

Representative ion exchange techniques are disclosed in a wide variety of patents including U.S. Pat. No.s 3,140,249; 3,140,251; and 3,140,253.

Following contact with the salt solution of the desired replacing cation, the aluminophosphate composition is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline material prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst comprising the present material is molded, such as by extrusion, the material can be extruded before drying or dried or partially dried and then extruded.

In the case of many catalysts, it may be desired to incorporate the hereby prepared aluminophosphate with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the present aluminophosphate, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized aluminophosphate include the montmorillonite and kaolin families which include the subbentonites, and the kaolins commonly known as Dixie, McNamee, Georgia and Florida clays, or others in which the main mineral constitutent is halloysite, kaolinite, dickite, nacrite or anauxite. Such clays can be used in the raw state as originally mined or initially subjected to calcination, acid treatment or chemical modification.

In addition to the foregoing materials, the crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalyst comprising the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 $hr^{-1}$, preferably between 1 and 4 $hr^{-1}$ and the hydrogen to hydrocarbon mole ratio is generally between 1 and 10, preferably between 3 and 5.

A catalyst comprising the present composition can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 $hr^{-1}$, preferably between 0.5 and 4 $hr^{-1}$, employing hydrogen such that the hydrogen mole ratio is between 1 and 10. Additionally, the catalyst can be used for olefin or aromatics isomerization employing temperatures between 0° C. and 550° C.

A catalyst comprising the aluminophosphate of this invention can also be used for reducing the pour point of gas oils. This process is carried out at a liquid hourly space velocity between about 0.1 and about 5 $hr^{-1}$ and a temperature between about 300° C. and about 425° C.

Other reactions which can be accomplished employing a catalyst comprising the composition of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented.

EXAMPLE 1

A 56.78 g quantity of 86% $H_3PO_4$ was diluted with 167.76 g $H_2O$. followed by the mixing of 25.5 g alpha-alumina monohydrate (i.e. Catapal SB) into the dilute phosphoric acid solution. This slurry was mixed, with stirring, at 25° C. for 10 minutes. To the resulting homogeneous suspension was added 25.5 g of 1,5-pentanediamine as directing agent.

The reaction mixture prepared had the following composition, in mole ratios:

| | | |
|---|---|---|
| $P_2O_5/Al_2O_3$ | = | 1.0 |
| $H_2O/Al_2O_3$ | = | 40 |
| $H^+/Al_2O_3$ | = | 8.0 |
| $R/Al_2O_3$ | = | 1.0 | with R being the 1,5-pentanediamine.

The mixture was then transferred to a 300 ml stainless steel autoclave. The sealed autoclave was heated to 180° C. and stirred (400 rpm) at this temperature and autogenous pressure for 3 days.

The crystalline product composition was separated from the final liquids by filtration, water washed, and then dried at 110° C. The dried product crystals were analyzed by X-ray diffraction, proving it to be the present aluminophosphate composition comprising crystals having large pore windows. Table 2 lists the X-ray diffraction pattern of the dried, as-synthesized, product of this example.

TABLE 2

| Interplanar d-Spacings (A) | Observed 2×Theta | Relative Intensities ($I/I_o$) |
|---|---|---|
| 14.012 (shoulder) | 6.31 | |
| 13.721 | 6.44 | 29 |
| 13.306 (shoulder) | 6.64 | |
| 12.152 | 7.27 | 5 |
| 10.449 | 8.46 | 1 |
| 10.037 | 8.81 | 1 |
| 9.819 | 9.00 | 1 |
| 9.449 | 9.36 | 100 |
| 8.571 | 10.32 | 3 |
| 8.083 | 10.94 | 1 |
| 7.525 | 11.76 | 2 |
| 7.421 | 11.92 | 1 |
| 7.095 | 12.48 | 1 |
| 6.867 | 12.89 | 1 |
| 6.688 | 13.24 | 2 |
| 5.927 | 14.95 | 3 |
| 5.839 | 15.17 | 1 |
| 5.718 | 15.50 | 1 |
| 5.621 | 15.76 | 1 |
| 5.204 | 17.04 | 2 |
| 4.793 | 18.51 | 1 |
| 4.705 | 18.86 | 1 |
| 4.649 | 19.09 | 1 |
| 4.291 | 20.70 | 1 |
| 4.200 | 21.15 | 1 |
| 4.174 | 21.28 | 1 |
| 3.981 | 22.33 | 1 |
| 3.940 | 22.57 | 1 |
| 3.801 | 23.40 | 1 |
| 3.768 | 23.61 | 1 |
| 3.735 | 23.82 | 8 |
| 3.629 | 24.53 | 1 |
| 3.564 | 24.93 | 2 |
| 3.435 | 25.94 | 1 |
| 3.322 | 26.84 | 1 |
| 3.237 | 27.55 | 1 |
| 3.180 | 28.06 | 1 |

EXAMPLE 2

A quantity of the product composition of Example 1 was analyzed for chemical composition, the results being as follows:

| Component | Wt. % |
|---|---|
| C | 13.76 |
| N | 6.18 |
| Na | 0.077 |
| Al | 11.51 |
| P | 16.64 |
| Si | 0.41 |
| Ash | 61.45 |

What is claimed is:

1. A method for syntehsizing a crystalline aluminophosphate composition having crystals exhibiting a characteristic X-ray diffraction pattern as shown in Table 1 of the specification, which comprises (i) preparing a mixture capable of forming said aluminophosphate, said mixture comprising sources of an oxide of aluminum, an oxide of phosphorus, water and a directing agent (R), and having a composition, in terms of mole ratios, within the following ranges:

| | |
|---|---|
| $P_2O_5/Al_2O_3$ | 0.01 to 20 |
| $H_2O/Al_2O_3$ | 2 to 400 |
| $H^+/Al_2O_3$ | 0.01 to 30 |
| $R/Al_2O_3$ | 0.02 to 20 | wherein R is a $C_5$–$C_7$ alkyldiamine, (ii) maintaining said mixture under sufficient conditions until crystals of said aluminophosphate are formed and (iii) recovering said crystalline aluminophosphate from step (ii).

2. The method of claim 1 wherein said mixture has the following composition ranges:

| | |
|---|---|
| $P_2O_5/Al_2O_3$ | 0.2 to 5 |
| $H_2O/Al_2O_3$ | 5 to 200 |
| $H^+/Al_2O_3$ | 0.5 to 20 |
| $R/Al_2O_3$ | 0.1 to 10 |

3. The method of claim 1 wherein said directing agent R is pentanediamine.

4. The method of claim 2 wherein said directing agent R is pentanediamine.

5. The method of claim 1 wherein said mixture further comprises seed crystals in sufficient amount to enhance synthesis of said crystalline aluminophosphate.

6. The method of claim 1 wherein said crystalline aluminophosphate composition exhibits an X-ray diffraction pattern substantially as shown in Table 2.

7. The method of claim 1 comprising replacing cations of the crystalline aluminophosphate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

8. The method of claim 2 comprising replacing cations of the crystalline aluminophosphate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

9. The method of claim 7 wherein said replacing cation is hydrogen or a hydrogen precursor.

10. The mdethod of claim 8 wherein said replacing cation is hydrogen or a hydrogen precursor.

11. The recovered crystalline aluminophosphate of claim 1.

12. The recovered crystalline aluminophosphate of claim 2.

13. A crystalline aluminophosphate composition comprising crystals exhibiting a characteristic X-ray diffraction pattern as shown in Table 1.

14. A catalyst composition comprising the recovered crystalline aluminophosphate of claim 11.

15. A catalyst composition comprising the recovered crystalline aluminophosphate of claim 12.

16. A catalyst composition comprising the crystalline aluminphosphate of claim 13.

17. A process for effecting catalytic conversion of an organic compound-containing feedstock which comprises contacting said feedstock under catalytic conversion conditions with the catalyst composition of claim 14.

18. A process for effecting catalytic conversion of an organic compound-containing feedstock which comprises contacting said feedstock under catalytic conversion conditions with the catalyst composition of claim 16.

* * * * *

UNITED STATES PATENT AND TRADEMARK OFFICE
CERTIFICATE OF CORRECTION

PATENT NO. : 4,877,593
DATED : October 31, 1989
INVENTOR(S) : E.W. Valyocsik It is certified that error appears in the above-identified patent and that said Letters Patent is hereby corrected as shown below:

Col. 1, line 16     "matrial" should be --material--
Col. 1, line 18     "orgranic" should be --organic--
Col. 2, line 16     "No. 192" should be --No. 392--
Col. 2, lines 56-57     "As-$PO_4$-20" should be --$AlPO_4$-20--
Col. 3, line 23     "calims" should be --claims--
Col. 4, line 14     "crystlline" should be --crystalline--

Col. 5, lines 28-29     "$vA:M_{x/m}^{m\pm}:AlO_2)_{1-y}^{-}:PO_2)_1$ 31

$x^+:N_{y/n}^{n-}:w(H_2O)$" should be

--$vA:M_{x/m}^{m\pm}:(AlO_2)_{1-y}^{-}$ $:(PO_2)_{1-x}^{+}:N_{y/n}^{n-}:w(H_2O)$--

Col. 5, line 66     "bweam" should be --beam--
Col. 6, line 6     "asecond" should be --second--
Col. 6, line 52     "platnium" should be --platinum--
Col. 11, claim 10, line 1     "mdethod" should be --method--

UNITED STATES PATENT AND TRADEMARK OFFICE
CERTIFICATE OF CORRECTION

PATENT NO. : 4,877,593

DATED : October 31, 1989

INVENTOR(S) : E. W. Valyocsik

It is certified that error appears in the above-identified patent and that said Letters Patent is hereby corrected as shown below:

Col. 12, claim 16, line 2    "aluminphosphate" should be --aluminophosphate--

Signed and Sealed this

Thirtieth Day of October, 1990

Attest:

HARRY F. MANBECK, JR.

Attesting Officer

Commissioner of Patents and Trademarks